June 10, 1947.  G. B. ENGELHARDT  2,421,747
OBJECT LOCATING SYSTEM
Filed July 14, 1943   5 Sheets-Sheet 1
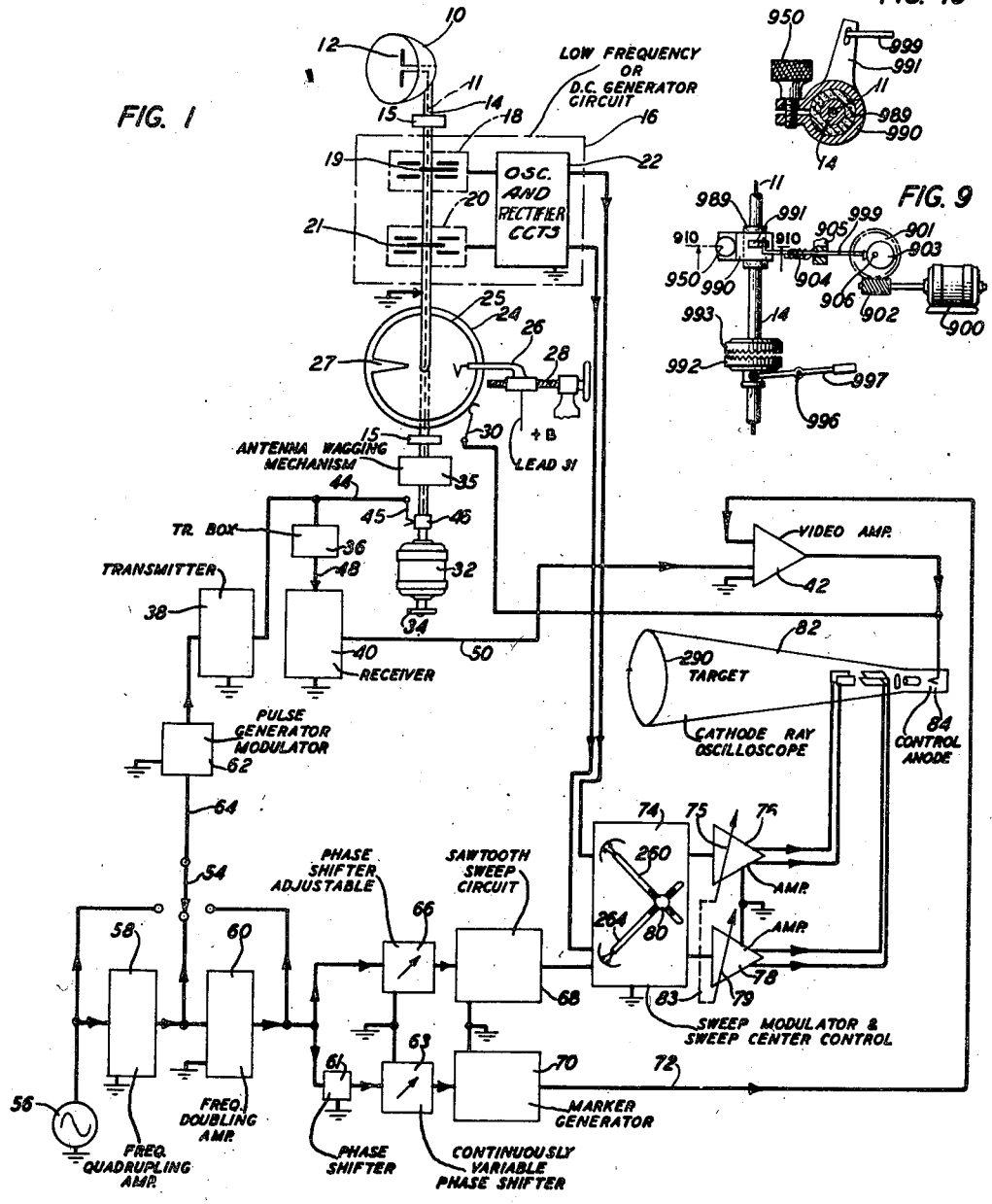
INVENTOR
G. B. ENGELHARDT
BY
ATTORNEY

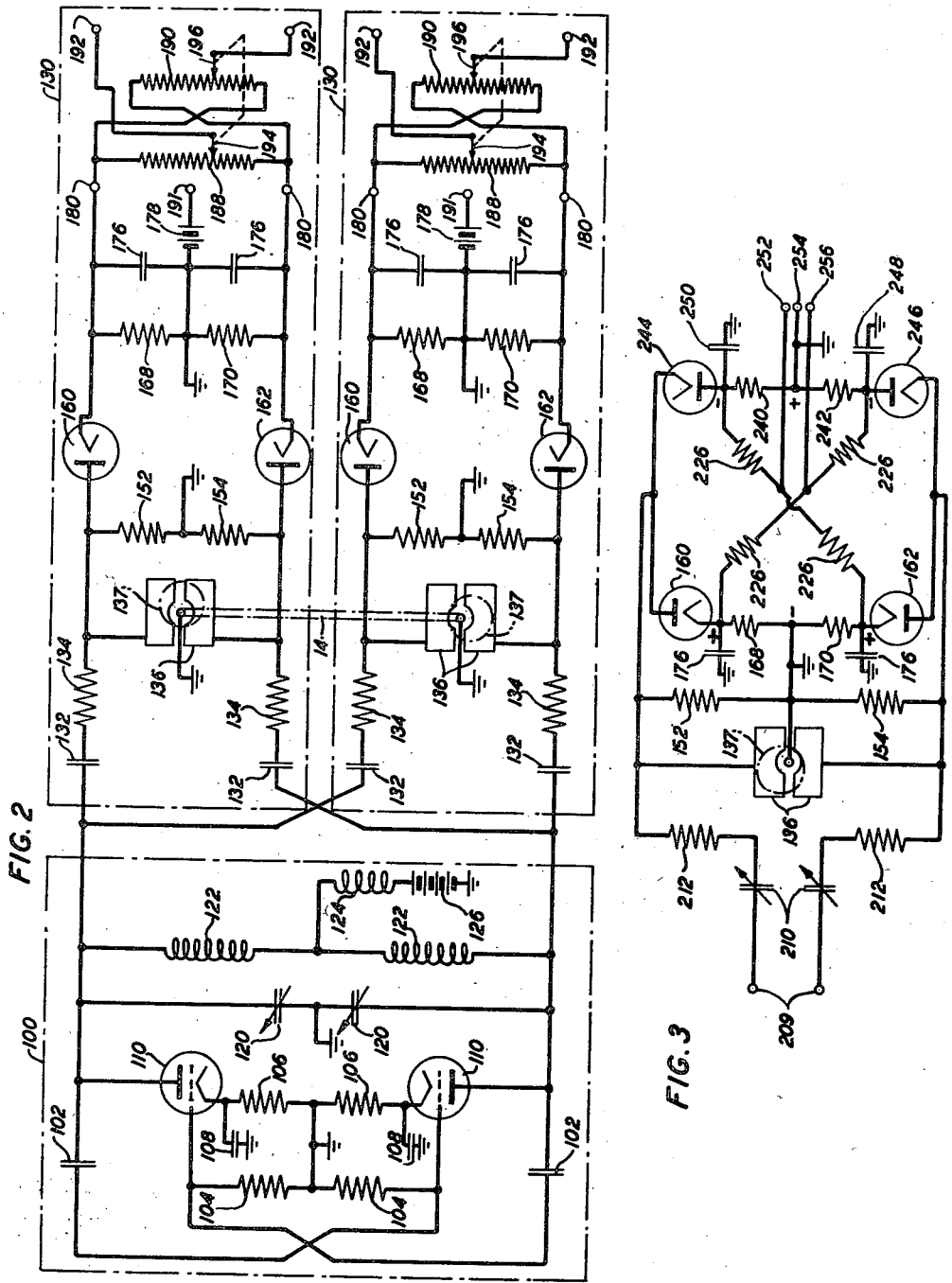

June 10, 1947.  G. B. ENGELHARDT  2,421,747
OBJECT LOCATING SYSTEM
Filed July 14, 1943  5 Sheets-Sheet 5
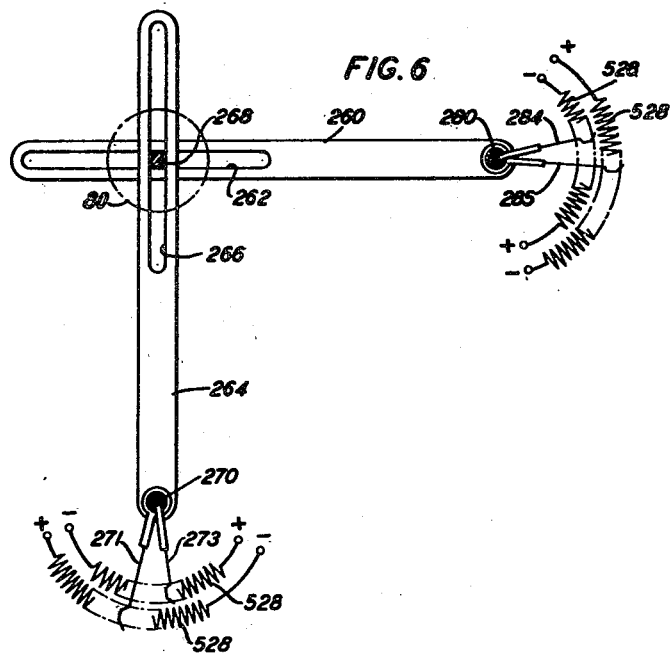
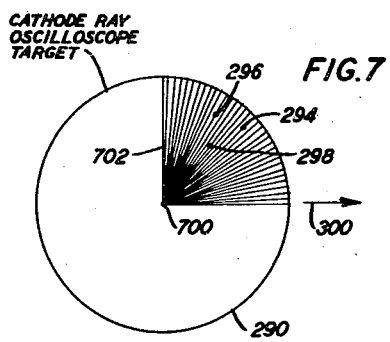
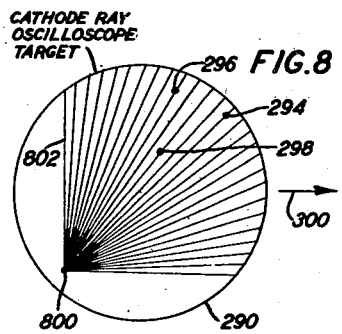
INVENTOR
G. B. ENGELHARDT
BY
ATTORNEY Patented June 10, 1947

2,421,747

UNITED STATES PATENT OFFICE 2,421,747

OBJECT LOCATING SYSTEM

George B. Engelhardt, Hartsdale, N. Y., assignor to Bell Telephone Laboratories, Incorporated, New York, N. Y., a corporation of New York Application July 14, 1943, Serial No. 494,666

11 Claims. (Cl. 250—1.62)

This invention relates to radio pulse-reflection object-location systems employing a rotatable exploratory beam antenna. More particularly, it relates to improved circuit arrangements for obtaining voltages for controlling the rotation of the ray of a cathode ray oscilloscope, or an equivalent indicating means, in accordance with the turning motion of the exploratory antenna in such systems.

The arrangements of the present invention comprise circuits including capacity controlled type generators and provide for transmitting electrically, to the cathode ray, or equivalent indicator, the rotary motion of the exploratory antenna.

These arrangements provide two direct current voltages which for any particular position of the rotating exploratory antenna, provide by their relative magnitudes and polarities an indication of a specific unique angular position, or azimuth, corresponding to the instantaneous azimuth of the directive beam of the antenna, when applied to deflect the ray of the cathode ray oscilloscope, or equivalent indicating mechanism. These voltages, of course, vary as the antenna turns and have particular unique relative magnitudes and polarities for each position throughout a complete rotation.

If the antenna is rotated uniformly the voltages preferably vary sinusoidally, one being displaced 90 degrees electrically with respect to the other, so that they may then be considered as low frequency sinusoidal quadrature voltages. Unlike systems employing electromagnetic-type generators the devices of the invention will function properly even when the antenna is stopped or rotated intermittently in opposite directions or turned slowly in the manner which is normally employed when the antenna is turned by a hand-wheel to observe, in detail, reflections from a particular narrow angular sector of the area being scanned.

A chief object of the invention is, therefore, to provide improved methods and means for the electrical transmission to an indicating device of the rotary motion of an exploratory antenna which may be rotated intermittently in either direction, at varying speeds and may at times be held stationary.

A further object is to provide a convenient means for expanding a particular portion of a plan position indication.

Other objects of the invention and the principles thereof will become more readily apparent from the following detailed description of the illustrative embodiments shown in the accompanying drawings, in which:

Fig. 1 illustrates in block schematic form the application of the principles of the invention to a plan-position-indicating object locating system;

Fig. 2 shows in schematic diagram form one form of electrical circuit for providing the "low frequency" quadrature or direct current "quadrature" voltages;

Fig. 3 shows in schematic diagram form a modified circuit for providing one of the "low frequency" or direct current voltages;

Fig. 6 shows the slotted lever potentiometer control combination employed in displacing the scanning center of the oscilloscope pattern preparatory to obtaining an expanded showing of a particular sector of the total indication;

Figs. 7 and 8 are illustrative of the types of indications obtainable with systems of the invention; and Figs. 9 and 10 show in detail a mechanism for oscillating or wagging the exploratory antenna through an arc.

Figure 4:
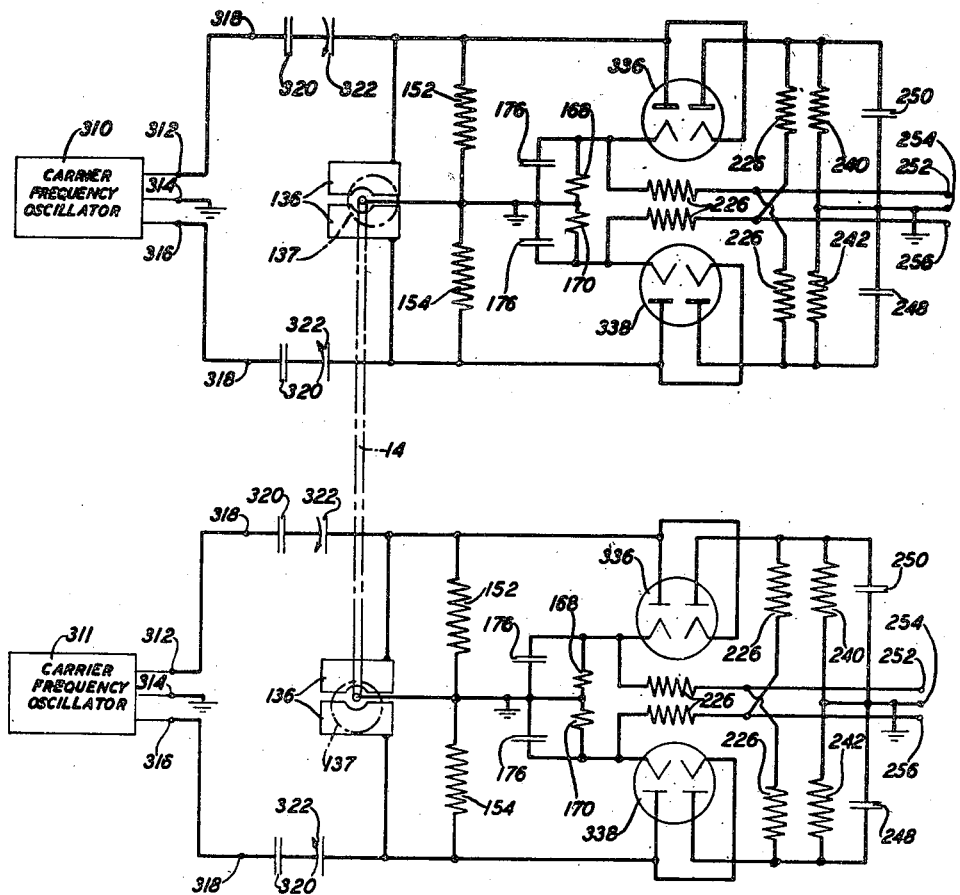
Fig. 4 shows in schematic diagram form a further electrical circuit for providing the "low frequency" quadrature or direct current voltages.

In more detail in Fig. 1, a dipole antenna 12 is located substantially at the focus of a parabolic reflector 10. The combination is supported on a vertical rotatable tubular shaft 14, which can be rotated in bearings 15 by a motor 32, or by a hand-wheel 34, or by oscillating or "antenna wagging" mechanism 35.

Shaft 14 carries the rotors 19 and 21 of variable two stator capacities 18 and 20, respectively. These capacitors together with a circuit 22 comprise a capacity controlled "low frequency or direct current generator circuit" 16, preferred forms of which are shown in Figs. 2, 3 and 4 and will be described in detail hereinunder. This type of capacitor will be referred to throughout this application as a capacity type voltage divider or potentiometer.

Shaft 14 also carries a special commutator 24 having a conductive ring electrode 25 around its outer periphery to which is connected a conducting V-shaped segment 27, the center portion of the commutator being of insulating material. Contacting member 30 makes contact with ring electrode 25 and contacting member 26 is radially adjustable, by turning the threaded rod support 28. Once during each revolution member 26 makes contact with the V-shaped segment 27, at a distance from its outer end determined by the radial position of member 26 so that the circuit including members 26, 30, lead 31 to a source of voltage +B and control anode 84 of cathode ray oscilloscope 82, is closed once during each revolution for an interval determined by the width of segment 27 at the radial distance to which contacting member 26 has been adjusted. This provides a radial azimuth angle index, or reference, line of adjustable width on the target of the cathode ray oscilloscope 82, which can obviously be made, by appropriate mechanical adjustment, to indicate a particular compass direction, such as north for a system located at a fixed observing station, or a particular direction such as the heading of the craft when the system is used on marine vessels or aircraft.

Oscillating or "antenna wagging" mechanism 35 provides for oscillating the shaft 14 back and forth through an arc so that a segment only of the complete circular area swept in rotating the antenna system through 360 degrees can be selected for detailed observation as will be described in greater detail hereinafter. Mechanism 35 is illustrated in detail in Figs. 9 and 10 and will be described in connection therewith.

Base oscillator 56 provides a sine wave of a convenient low frequency such as 500 cycles per second. A frequency quadrupling amplifier 58 of any convenient one of the numerous forms well known to the art, provides a higher frequency (2000 cycles per second in this instance) and a like frequency doubling amplifier 60 provides a still higher frequency (4000 cycles per second in this instance).

Switch 54 can be operated to select any of the three frequencies thus made available. The frequency selected by switch 54 operates pulse generator modulator 62 which in turn energizes transmitter 38 to furnish radio frequency pulses through conductor 44, brush 45, slip ring 46 and insulated conductor 11 passing through the center of shaft 14 to the antenna 12. These pulses are preferably of from one-half to two microseconds in duration and occur once during each cycle of the frequency selected by switch 54. In general the pulses of the lowest frequency of occurrence will be used for routine searching operations and the higher frequencies of occurrence will be employed when particular objects of interest are to be studied with greater care. The useful life of the transmitting vacuum tubes can be substantially increased by limiting the frequency of operation. The time interval between successive pulses occurring at the highest rate (4000 cycles per second) is presumed to be adequate for the receipt of reflections from an object at the maximum range to be measured by the system before the next consecutive pulse is transmitted. This time interval (1/4000 second) fixes the maximum range of the system at slightly over 20 miles, since radio waves travel at 186,000 miles per second and the wave must travel to the object and its reflection must travel back to the observing station. A longer range can obviously be conveniently covered with the 2000-cycle frequency pulse, if desired.

Figure 5:
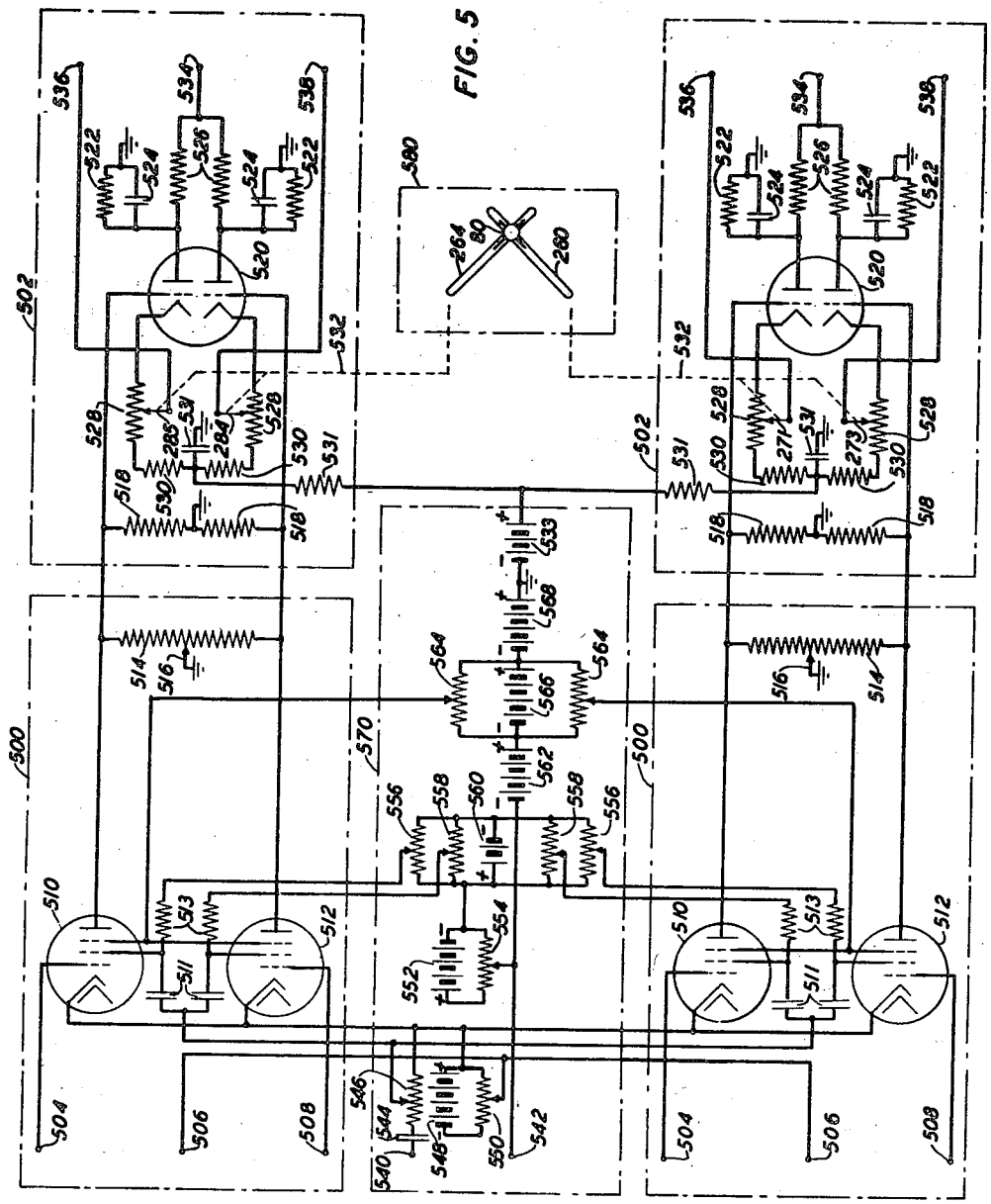
Fig. 5 shows, in schematic diagram form, balanced modulator and center positioning circuits suitable for use in systems of the invention.

The sweep modulator and center positioning circuit 74 receives the capacity controlled "low frequency or direct current" voltages from circuit 16 and a saw-tooth sweep voltage from sawtooth wave generator 68. One convenient form for circuit 74 is shown in Fig. 5 and will be described in detail, hereinafter. Circuit 16 provides two sinusoidally varying voltages bearing a quadrature relation to each other, when antenna system 10, 12 is rotating uniformly. Convenient forms of circuit 16 are shown in Figs. 2, 3 and 4 described below. The voltages from circuit 16 are severally modulated by the saw-tooth wave of sweep circuit 68 and one modulated wave is amplified in amplifier 76 and applied to the horizontal deflecting plates of oscilloscope 82 and the other is amplified in amplifier 78 and applied to the vertical deflecting plates of oscilloscope 82. The combined modulated waves thus produce a radial sweeping action of the ray of oscilloscope 82 which turns about a sweep center point in synchronism with any turning motion of the antenna system 10, 12.

Each of the amplifiers 76 and 78 is provided with a manually adjustable volume control, that for amplifier 76 being control 75, that for amplifier 78 being control 79. Controls 75 and 79 are ganged together so that the gain of both amplifiers may be changed together in the same direction by a sweep magnitude control 83, so that the radial sweep with respect to the center point of the sweeping action can be adjusted to fully cover any desired portion of the oscilloscope target.

Controls 260 and 264 of circuit 74 are effective to control the no signal, no sweep voltage position of the ray or the sweep center point, and are ganged together through a mechanism operable by a single control knob 80. This mechanism is shown in detail in Fig. 6 and described below. The position of rest of the ray of the oscilloscope can be adjusted differentially by this mechanism to position the "sweep center point" as desired on the target of the oscilloscope in order to permit expansion of a particular portion of the pattern of objects obtained from the entire circular area swept by the directive antenna in a manner which will be explained in detail in connection with Figs. 5, 6, 7 and 8 of the accompanying drawings. Movement of the single control knob 80 effects the positioning of the sweep center point as desired. From this it is apparent that the sweep center point need not always be coincident with the center point of the screen of the oscilloscope.

The TR box 36 is preferably a resonant cavity with a gas-filled low-voltage-breakdown vacuum tube therein and is operated by energy from the transmitter 38 to detune the cavity and thus protect receiver 40 from overloading during transmitting periods. Upon the cessation of a pulse from transmitter 38, the gas tube of the TR box 36 restores itself substantially instantaneously to condition receiver 40 for the receipt of reflections of the transmitted pulse returning to antenna 12. The output of receiver 40 is impressed through video amplifier 42 upon control anode 84 of oscilloscope 82 to intensity modulate the ray thereof so that a pattern of bright spots representing reflecting objects at their respective azimuth angles and at distances from the sweep center point proportional to their respective distances from the observation point is obtained. This type of indication is known in the art as a plan position indication and systems providing such indication patterns are known as plan position indicating systems. The types of indications provided by systems of this invention are illustrated in Figs. 7 and 8 and will be discussed in more detail hereinafter.

The marker generator 70 provides a series of short marker pulses the phase of which with respect to the start of each saw-tooth wave sweep is adjustable by continuously variable phase shifter 63 so that an arc or circle of marker pulses may be provided on the screen of the oscilloscope at a distance (or radius) from the sweep center point determined by the adjustment of phase shifter 63.

Phase shifter 63 may obviously be calibrated in yards or other convenient units of distance so that the range of a particular object can be accurately determined by adjusting this phase shifter until the arc or circle of marker pulses coincides in radial distance from the sweep center point with the particular object.

Adjustable phase shifter 66 is employed to adjust the phase of the energy to the saw-tooth sweep circuit 68 so that the radial sweep start from the sweep center point in accurate synchronism with the emitted pulses and adjustable phase shifter 61 is employed to accurately adjust the range marks to zero position for the zero of the range calibration of variable phase shifter 63, i. e., for zero range the range circle should be a point coincident with the sweep center point. The marker pulses are also passed through video amplifier 42 before being impressed on control anode 84. As is well known in the art a video amplifier should amplify with substantial uniformity all frequencies between a few cycles per second and several megacycles (2 to 5) in order to faithfully reproduce short squared-top pulses of the type preferred for use in pulse-reflection object location systems, such as that of Fig. 1.

In Fig. 2 the circuit 100 comprises a well-known form of balanced vacuum tube oscillator in which "criss-cross" feedback is employed. The frequency determining, or "tank" circuit comprises, of course, inductances 122 and capacities 120. The latter are preferably adjustable to provide minor adjustment of the frequency of oscillation and to permit accurate balancing of the two sides of the oscillator. Feedback circuits, comprising capacities 102 and resistors 104, couple the plate of each tube to the grid of the other tube in the balanced oscillatory circuit. Resistors 106 provide a cathode circuit bias and are shunted by by-pass condensers 108.

Inductance 124 serves to exclude alternating current from the source of anode potential 126.

The frequency of the oscillatory circuit 100 must be very high with respect to the rotational speed of the shaft 14 carrying the rotors 137 of capacitors 136. Since the speed of shaft 14 is such that the modulations resulting from rotation of rotors 137 are of low audio frequency the frequency of oscillatory circuit 100 can be conveniently chosen in the carrier frequency range. It should, preferably, not be too high because increased difficulties in maintaining the desired degree of frequency stability and in shielding to prevent unwanted radiation or crosstalk would then be encountered and no substantial compensating advantages would be present. By way of example, a frequency of approximately 350 kilocycles can be conveniently employed.

The input leads of the two "low frequency-direct current" generating circuits 130 are connected in parallel across the output of oscillatory circuit 100 as shown in Fig. 2. The circuits 130 are each balanced with respect to ground and are identical except that the rotor 137 of the two-stator capacitor 136 of one circuit is displaced 90 degrees on the common drive shaft 14 with respect to the rotor 137 of the other circuit. Series capacities 132 serve to isolate circuits 130 from the direct current source 126 and together with series resistances 134 serve to provide better impedance matching of circuits 130 with circuit 100. In addition, resistances 134 serve to substantially reduce the interaction between the two circuits 130. In other words, resistances 134 "pad" the input impedances of circuits 130 so that the impedance variations caused by the rotation of the rotor 137 of one circuit 130 will have less reaction upon the effective impedance of the other circuit 130 as well as less reaction upon the oscillatory circuit 100.

The two-stator capacitor 136 is, in effect, a capacity or alternating current type potentiometer serving to divide the total input alternating current voltage to its associated balanced circuit 130 between the two halves thereof, the division of this voltage at any instant being determined by the position of the rotor 137, part of the input voltage appearing across shunt resistor 152 and the remainder across shunt resistor 154. Rotor 137 is in the form of an eccentrically mounted disc. As taught in Patent 2,147,728, issued February 21, 1939, to W. T. Wintringham the change in capacity with a rotor so shaped is proportional to the angle through which it is rotated, i. e. the device, when rotated uniformly, will produce sinusoidal voltage variations. Resistors 152 and 154 also serve to complete the direct current or rectified current path for diodes 160 and 162, respectively.

With rotor 137 in the position indicated in Fig. 2 for the upper circuit 130 an equal division of the input voltage between resistors 152 and 154 will occur. Diode rectifying vacuum tubes 160 and 162 rectify the alternating current voltages present across resistors 152 and 154, respectively, and cause pulsating direct current voltages of opposite polarities to be developed across cathode resistors 168 and 170, respectively. Capacities 176 by-pass high frequency currents.

Source of direct current potential 178 serves to neutralize longitudinal voltages developed in the circuit 130 the nature of which will be more readily comprehended from the following brief explanation.

It is desired that for the mid-position of rotor 137 as shown in the upper circuit 130 of Fig. 2, that the voltage between each of terminals 180 and terminal 191 be zero and that as the rotor 137 turns clockwise, for example, the voltage between lower terminal 180 and terminal 191 will become increasingly positive and that between upper terminal 180 and terminal 191 will become increasingly "negative," these two voltages being at each instant equal but of opposite polarity. Assuming that, for the position of rotor 137 shown in Fig. 2 for upper circuit 130, equal voltages of opposite polarity are developed across resistors 168 and 170 having a value of 50 volts, source 178 should then also have a value of 50 volts, the positive terminal of source 178 being connected to terminal 191 and the voltage between either terminal 180 and terminal 191 will be zero as desired.

Assuming further that rotor 137 is then turned clockwise sufficiently to divide the assumed total effective voltage of 100 volts so that only 20 volts appears across resistor 168 and 80 volts appears across resistor 170, then the lower terminal 180 will be at the potential of 80-50 or +30 volts with respect to terminal 191 and the upper terminal 180 will be at the potential of 20-50 or −30 volts with respect to terminal 191, i. e., terminals 180 will be at equal and opposite potentials with respect to terminal 191 as is desired. This will be found to be so for all positions of rotor 137, i. e., for all divisions of the total voltage between resistors 168 and 170, provided that the over-all circuit adjustments and power supply voltages remain substantially constant and the source 178 is accurately adjusted and maintained at the proper value.

By employing two identical potentiometers 188 and 190 connected across terminals 180 as shown in Fig. 2 any fractional part of the voltage differences between terminals 180 and 191 can be obtained on terminals 192 and, if desired, a phase reversal (180 degrees) can be obtained. The contacting members 194 and 196 of potentiometers 188 and 190 are ganged together to move over their respective potentiometers in identical manners. When members 194, 196 are above the potentiometer center points the voltage across terminals 192 will be in phase with that across terminals 180. When members 194, 196 are below the center points the voltage across terminals 192 will be reversed in phase with respect to that across terminals 180. These ganged potentiometers permit the voltages to be adjusted so that the desired magnitude of deflection can be more readily obtained in the indicating device operated by them and the quadrant in which a particular indication appears can more readily be made to agree with the quadrant being explored by the scanning antenna should complete orientation of the equipment by physical rearrangement be inconvenient.

To avoid possible errors which might arise if direct current potential neutralizing source 178 of a circuit 130 of Fig. 2 should vary from its proper value or if the adjustment or supply voltage of the over-all circuit vary, a somewhat more complicated but automatically functioning circuit, as shown in Fig. 3, can be employed.

In the circuit of Fig. 3 input terminals 209 receive the high frequency alternating current output of an oscillatory circuit such as circuit 100 of Fig. 2, and condensers 210 and resistances 212 serve substantially the purposes described above for condensers 132 and resistances 134 of Fig. 2. Condensers 210 can conveniently be made adjustable to facilitate balancing the over-all circuit to compensate for minor impedance irregularities. A capacity type potential divider 136 having rotor 137, resistors 152, 154, diodes 160, 162, resistors 168, 170 and condensers 176 are used for the identical purposes described for like-numbered elements in connection with circuits 130 of Fig. 2.

To provide automatic compensation two additional diodes 244 and 246 are employed. These diodes are connected as shown in Fig. 3 with the cathode of diode 244 connected to the anode of diode 160 and the cathode of diode 246 connected to the anode of diode 162. In the anode circuits of diodes 244 and 246 are connected resistors 240 and 242 which are proportioned to provide voltages of the same magnitude as those developed across resistors 168 and 170, respectively. Since resistors 240 and 242 are in the anode leads of their respective diodes the voltages developed across them will be of opposite sign or polarity with respect to those developed across resistors 168 and 170. Two pairs of equal resistors 226 are then cross-connected between the cathode of diode 160 and the anode of diode 246 and between the cathode of diode 162 and the anode of diode 244 and terminals 252 and 256 are connected, as shown in Fig. 3, to the mid-points of the respective pairs of equal resistors 226. Obviously, when equal voltages are developed across resistors 168 and 240 and across resistors 170 and 242, the potential of each of terminals 252, 256 will be zero with respect to ground on terminal 254. Also when, for example, the voltages developed across resistors 168 and 240 are 20 volts each, and those across resistors 170 and 242 are 80 volts each (assuming a total voltage of 100 volts across each pair of diode circuit resistors as in the example assumed for the circuits 130 of Fig. 2) the mid-point of cross resistors 226 connecting to terminal 252 will be at the voltage midway between —20 and +80 volts or +30 volts and terminal 256 will be at the voltage midway between +20 and —80 volts or —30 volts, i. e., the potential differences of terminals 252 and 256 with respect to ground will be of equal magnitude but of opposite polarities. This condition will obtain for all positions of the rotor 137 of the capacity potential divider 136, and provides the desired voltage variations of terminals 252 and 256 with respect to ground on terminal 254. Potentiometers 188 and 190 of Fig. 2 can be connected to terminals 252 and 256 of Fig. 3, if desired, as described for Fig. 2.

Fig. 4 represents a further form of circuit of the invention differing from Fig. 2 principally in that separate oscillators 310, 311 are employed to energize the upper and lower capacity controlled low frequency direct current generating circuits, and in that the last-mentioned circuits are of the type illustrated in Fig. 3 and described above.

The use of separate oscillators is advantageous in that the interaction of the two generating circuits upon each other and upon the common oscillator, where only one is employed, is avoided and, furthermore, the separate oscillators can be assigned substantially different frequencies so that crosstalk between the two generating circuits can be readily reduced to insignificance. Preferred values of frequency for the two oscillators of Fig. 4 can be, for example, 150 kilocycles and 250 kilocycles, respectively.

The series resistance 134 of Fig. 2 may be omitted in the corresponding circuits of Fig. 4 since there is no interaction between the latter circuits. Coupling with the respective oscillators 310, 311 of Fig. 4 and the low frequency or direct current generating circuits is effected by a fixed capacity 320 and an adjustable capacity 322 in series in each lead. This feature has been found advantageous since variable capacitances of the usual types can become short-circuited very readily by small particles of dust or stray bits of solder, etc., and damage may be caused by thus impressing the anode direct current supply of the oscillator across a portion of the low frequency generating circuit. In the circuits of Fig. 4 the fixed condenser 320 would still function to isolate the low frequency or direct current generating circuit from the direct current supply of the oscillator should the adjustable condenser 322 become short-circuited.

The low frequency or direct current generating circuits of Fig. 4 are identical with the circuit of Fig. 3 except that double diodes 336 and 338 of Fig. 4 takes the places of the four single diodes 160, 162, 244 and 246 of Fig. 3. The full equivalence of the diode circuits of Figs. 3 and 4 will be apparent to one skilled in the art upon inspection and comparison. Like-numbered elements perform like functions as for the elements of the circuit of Fig. 3.

In Fig. 5 a preferred form of sweep modulator and sweep center control (or positioning) circuit is shown suitable for use as apparatus unit 74 of Fig. 1.

This circuit comprises two balanced modulator circuits 500, two sweep center control circuits or center positioning circuits 502, a modulator control circuit 570 and a differential control mechanism 580.

In more detail in Fig. 5 each of the balanced modulator circuits 500 comprises a pair of pentode vacuum tubes 510, 512 arranged in conventional manner as a balanced modulator circuit. The input terminals 504, 506, 508 of the two modulators receive the output of two low frequency or direct current generating circuits such as circuits 130 of Fig. 2 or the corresponding circuits of Fig. 4, terminal 506 connecting in each case to the neutral terminal 191 of Fig. 2 or 254 of Fig. 4 and the terminals 504, 508 connecting to terminals 188, or 192, of Fig. 2 or 252, 256 of Fig. 4, respectively, the upper modulator circuit connecting to the upper low frequency generating circuit and the lower modulator circuit to the lower generating circuit, respectively.

The modulator control circuit 570 of Fig. 5 includes the potential sources and potentiometer controls for supplying the modulator circuits and center positioning circuits with suitable potentials and at its terminals 540, 542 receives the output of saw-tooth sweep wave generator circuit 68 of Fig. 1.

As is obvious from inspection of Fig. 5 the azimuth angle indicating low frequency or direct currents are applied to the first grids of the pentodes of their respective modulators and the saw-tooth sweep wave is applied to the second grids of all the modulator tubes, so that the output of each modulator circuit comprises its respective low frequency or direct current input voltage modulated by the saw-tooth sweep wave.

Voltage source 548 and potentiometer 550 bridged across it provides bias potential for the first grids of all the modulator tubes. Potential source 552 and potentiometer 554 bridged across it provides the main control for the bias placed on the second grids of all the modulator tubes, while potential source 560 and potentiometers 556 and 558 bridged across it provide for individual auxiliary adjustment of the bias voltage on each of the second grids of the modulator tubes. Voltage sources 562, 566 and 568 and potentiometers 564 bridged across source 566 provide bias voltage for all the screen grids of the modulator pentode vacuum tubes.

Coupling condensers 511 and grid resistors 513 function to feed the saw-tooth sweep voltage and at the same time maintain a proper bias on the suppressor grids of the pentode modulators.

Contact arm 516 of potentiometer 514 across the output of each modulator circuit is adjusted to balance the output of the modulator circuit with respect to ground.

Circuit 502 is in essence a balanced "cathode-following" circuit in which the voltage taken from the cathode circuits is adjustable by means of potentiometers 528 having adjustable contacting members 284, 285 for the upper circuit 502 of Fig. 5 and adjustable contacting members 271, 273 for the lower circuit 502 of Fig. 5. These contacting member pairs are ganged together and the two pairs are coupled through control mechanism 580 the mechanical details of which are shown in Fig. 6 and will be described presently. This arrangement constitutes the sweep center positioning control which permits the center from which sweeping action takes place to be positioned at any point on the cathode ray oscilloscope target.

The outputs of circuits 502 are connected to the inputs of balanced amplifiers 76 and 78 of Fig. 1.

In circuits 502 grid resistors 518 maintain the inputs in balanced-to-ground condition. Resistors 526 isolate the anode supply potential source which is connected to terminal 534 and prevent interaction between the two anode circuits of vacuum tubes 520. Resistance 522 and capacity 524 in parallel provide a suitable anode circuit impedance for each anode of tubes 520. Potentiometers 528 and resistances 530 permit the development of cathode circuit voltages of appropriate magnitude, the potentiometer permitting, as noted above, a desired portion of this voltage to be selected for sweep center positioning purposes. Capacity 531 completes for AC the cathode circuits of vacuum tube 520 and serves to by-pass the mid-point of resistances 530 to ground. The direct current return path of the cathodes of vacuum tubes 520 is completed through resistance 531 and battery 533 of circuit 570 which establishes a proper average operating bias on tubes 520.

In Fig. 6 the mechanical details of the center positioning control mechanism 580 of Fig. 5 are shown. This mechanism comprises two levers 260 and 264 provided with longitudinal slots 262 and 266, respectively, in which a pin 268 is situated. Lever 260 can turn about fixed pin 280 and in so doing turns contacting members 284 and 285 to adjust their positions on their associated potentiometer resistors 528. Lever 264 can turn about fixed pin 270 and in so doing turns contacting members 271 and 273 to adjust their positions on their associated potentiometer resistors 528. The individual potentiometers of each pair are "poled" oppositely as indicated by the + and − signs adjacent their respective terminals in Fig. 6 so that as the voltage selected from one of each pair is increased, that selected from the other of the same pair will decrease a like amount and the sweep center point will be moved toward the deflecting plate on which the voltage is being increased. By orienting the mechanism with respect to the deflecting plates to which the potentials of the several potentiometers are applied, after amplification in amplifiers 76 and 78 of Fig. 1, the sweep center point can be made to follow the motion of the pin 268 and any particular portion of the area being swept by the exploratory beam of antenna 12, 10 of Fig. 1 can then be expanded by increasing the gain of amplifiers 76, 78 of Fig. 1 as illustrated in the typical indicator patterns of Figs. 7 and 8. Pin 268 is provided with a knob 80, shown dotted in Fig. 6, but in full in Figs 1 and 5, to facilitate manual adjustment as desired.

In Fig. 7 the sweep center point 700 is coincident with the center point of the target 290 of the cathode ray oscilloscope 82 of Fig. 1 and, in sweeping the upper right quadrant of the area being scanned by the system, reflections are received from three objects 294, 296 and 298, at three different azimuth angles.

In Fig. 8 the sweep center point 800 has been adjusted to the lower left section of the oscilloscope target 290 and the sweep has been expanded by increasing the gain of amplifiers 76, 78 of Fig 1 to expand the pattern of the objects 294, 296 and 298 as shown in Fig. 8 so that their relative positions and their respective distances can be observed in greater detail and with increased accuracy.

The lines 702 and 802 emanating radially from the sweep center points 700 and 800 of Figs. 7 and 8, respectively, represent the sweep paths of the ray in scanning the sector of interest. Normally they do not appear on the target since the intensity of the ray is usually reduced in the absence of a received reflected signal so that the sweep lines will not be visible. Arrow 300 in both of the Figs. 7 and 8 can be the heading of a mobile craft on which the system of Fig. 1 is carried or it can be a known compass direction such as magnetic north, the latter orientation being more suitable when the system of Fig. 1 is used at a fixed point. Also when a particular sector only, of the total circular area swept by rotating the antenna of Fig. 1, is of particular interest the antenna can be oscillated over that sector only, by means of handwheel 34 or by means of oscillating mechanism 35.

In Figs. 9 and 10 a preferred form of mechanism 35, which, from its function, can aptly be called an "antenna wagging" mechanism, is shown in detail. Fig. 9 shows the details of the arrangement and Fig. 10 is a cross-section to double scale through line 910—910 of the shaft 14 and shaft rotating members 990, 989, etc. looking upward from the cross-section line. The mechanism comprises a conventional clutching arrangement including plates 992 and 993 operable by lever 997 carried on pivot 996, a split and sprung collar 990, which is provided with a clamping screw 950 having a knurled head, by the turning of which the collar can be tightened on cylindrical cork, or leather, washer 989 interposed between collar 990 and shaft 14, an arm 991 extending radially from collar 990 and having a slot therein, in which slot the end of rod 999 engages, a bearing 905 through which rod 999 can slide, a spring 904 tensioned to draw rod 999 to the right into contact with an eccentric cam 903, mounted on a shaft 906 which shaft also carries a worm wheel 901 which engages a worm gear 902 mounted on the shaft of a motor 900 which serves to drive the wagging mechanism when desired.

In operation antenna 12, 10 is pointed generally by hand-wheel 34 toward the sector to be scanned by wagging the antenna, lever 997 is lifted to release or drop clutch plate 992 so that it is disengaged from the upper clutch plate 993, clamping screw 950 is tightened by turning its knurled head so that collar 990 clamps to washer 989 and through it to shaft 14. Motor 900 is then started, turning gears 902, 901 which turn shaft 906 and cam 903, causing together with spring 904, the rod 999 to move back and forth in bearing 905 and to turn shaft 14, through arm 991 of collar 990. The extent of the arc through which shaft 14 is turned can of course be determined by the dimensions of the component elements of the mechanism and can obviously, readily be made adjustable by providing cams of different sizes or lever arms of different lengths or by numerous other well-known mechanical expedients. Of course, a large number of entirely different mechanical arrangements can be readily devised by a skilled mechanic to provide the desired wagging motion of the antenna system.

Numerous other arrangements embodying the principles of the invention will readily occur to those skilled in the art. The scope of the invention is defined in the following claims.

What is claimed is:

1. In an object detecting system of the type in which a sharply directive pulsed radio energy beam is turned to scan an area, reflections of said beam are received, amplified and applied to actuate an indicating device, the indicating device including a movable marking member which is caused to scan an area of the target of the device in synchronism with the scanning action of the radio beam and to produce an indication on said target whenever a reflected pulse is received, means for synchronizing the turning movement of said movable marking member with the turning movements of said beam which includes an electrical source of oscillatory energy the frequency of which is high with respect to the maximum rotational speed of the scanning beam, said source being balanced with respect to ground, a capacity type potential divider comprising a single rotor mounted for rotation on a shaft which turns when said beam is turned and two stators placed adjacent on opposite sides of said shaft the two stators being electrically coupled to the two ungrounded output terminals of said source of oscillatory energy, the rotor of said divider entering one stator as it leaves the other, a balanced to ground rectifying circuit the ungrounded input terminals thereof connecting to the two stators respectively of said capacity type potential divider, the ground terminal of said rectifying circuit and the rotor of said capacity divider connecting to ground, a pair of load resistors one in each of the respective outputs of the two sides of said balanced rectifying circuit, one terminal of each of said pair of resistors being grounded and means for balancing out the mean value longitudinal voltages to ground whereby equal and opposite voltages with respect to a common terminal are obtained at the other terminals of said load resistors respectively for each position of the rotor of said capacity divider.

2. The arrangement of claim 1 the means for balancing out longitudinal voltages comprising a source of voltage poled and adjusted to the appropriate balancing value.

3. The arrangement of claim 1 the means for balancing out longitudinal voltages comprising a second balanced to ground rectifying circuit the ungrounded input terminals thereof connecting to the two stators respectively of said capacity type potential divider, the ground terminal of said rectifying circuit connecting to ground, said circuit having a pair of load resistors one in each of the respective outputs of the two sides of said second balanced rectifying circuit one terminal of each of said pair of resistors being grounded, said circuit being poled and proportioned to provide voltages of equal magnitude but of opposite polarity to ground with respect to the voltages of the first balanced to ground rectifying circuit and two pairs of equal resistors cross-connected between the ungrounded terminals of the opposite load resistors of said first and said second balanced rectifying circuits whereby terminals connecting to the mid-points of said cross-connected pairs of resistors will have voltages of equal magnitude but opposite polarity with respect to ground for any position of said capacity type potential divider and longitudinal voltages to ground will be balanced out.

4. The circuit of claim 1 and a second circuit including a second capacity type potential divider the rotor of which is carried on a common shaft with the rotor of the first capacity type potential divider the rotor of said second divider being displaced 90 degrees with respect to the rotor of said first divider, said second circuit including also a balanced to ground rectifying circuit, a pair of output resistors and means for balancing out longitudinal voltages to ground arranged and connected as described for said first circuit, the stators of the capacity divider of said second circuit also being electrically coupled to the ungrounded terminals of said source of oscillatory energy, respectively.

5. In the art of object location by rotatable exploratory means the method of obtaining a pair of voltages the relative magnitudes and polarities of which uniquely indicate the direction in which the exploratory means is directed for any position within a complete revolution of said means which method comprises generating oscillatory energy of a frequency which is high with respect to the maximum rate at which the exploratory means is to be rotated and which is balanced to ground, dividing the said oscillatory energy into two portions, subdividing each portion into two sub-portions, varying the relative magnitudes of the first pair of sub-portions in accordance with the direction of the rotatable exploratory means with respect to a first particular reference direction, varying the relative magnitudes of the second pair of sub-portions in accordance with the direction of the rotatable exploratory means with respect to a second particular reference direction which is displaced 90 degrees with respect to said first particular reference direction, and severally rectifying and differentially combining each pair of sub-portions of said energy and balancing out the mean value longitudinal voltages to ground to obtain the desired pair of voltages whose relative magnitudes and polarities uniquely indicate the direction in which the exploratory means is directed.

6. In an object locating system of the type in which an exploratory sharply directive pulsed energy beam is turned to scan an area, reflections of said beam from objects within said area are received, and a pattern of indications is obtained on an indicator in which pattern each object is represented by an indication at an angle from a center point corresponding to its azimuth angle with respect to the position of the exploratory means and at a distance from said center point which is proportional to the object's distance from said exploratory means, means for expanding a portion of said pattern which includes means for displacing the center point of said pattern from the center point of the indicator and means for expanding the radial sweep of said indicating means whereby a desired portion of said pattern is expanded to provide a more detailed view thereof.

7. The arrangement of claim 6 and means for oscillating the exploratory beam of said system through that portion of a complete revolution only for which an expanded pattern is desired.

8. In an object detecting system of the type in which a sharply directive pulsed energy beam is rotated to scan an area, reflections of said beam are received, amplified and applied to actuate an indicating device, the indicating device including a movable marking member which is caused to scan an area of the target of the device in synchronism with the scanning action of the radio beam and to produce an indication on said target whenever a reflected pulse is received, means for obtaining a voltage which varies continuously and sinusoidally between a maximum value of one polarity and a like maximum value of the opposite polarity for each complete revolution of the mechanical rotation of a rotatable member when said member is rotated at a uniform rate, the rotation of said member being synchronized with the rotation of said energy beam, said means comprising in combination a source of high frequency oscillations, a continuously variable capacity type voltage divider having rotatable variation control means transferring the voltage differentially and alternately between two output circuits, a balanced rectifier circuit, and mechanical coupling means operatively coupling the variation control means of said voltage divider to rotate in synchronism with said member, said voltage divider operatively coupling said source of high frequency oscillations with the two sides of said balanced rectifier circuit to distribute the energy of said source differentially and alternately to the two sides of said balanced rectifier circuit, said rectifier circuit combining in opposition the portions of said energy rectified in the respective two sides of said rectifier circuit to provide the voltage having the desired variation characteristics.

9. The combination of claim 8 and means for selecting any desired portion of the variation range of said varying voltage.

10. In combination two arrangements as defined in claim 8, the rotatable variation control means of the respective voltage dividers of said two arrangements being displaced with respect to each other by 90 degrees whereby two sinusoidally varying voltages displaced 90 degrees in phase are obtained when the member is rotated at a uniform rate.

11. In a radio object detecting and ranging circuit, having a highly directive rotatable exploratory antenna and an indicating device having a display screen and a movable member which scans an area of said display screen in synchronism with the scanning of an area in space by said exploratory antenna, means for facilitating the control of the scanning movement of said movable member which includes a source of high frequency oscillations the output of which is balanced to ground, a capacity type continuously variable voltage divider comprising a single rotor and two stators placed closely adjacent so that the rotor in leaving one stator enters the other, the rotor being connected to ground, the stators being connected to opposite sides of the output of said source of high frequency oscillations, a rectifying circuit having two sides which are balanced with respect to ground, said voltage divider cooperatively coupling said high frequency source with said rectifying circuit to differentially and alternately transfer the energy of said source to the two halves of said rectifying circuit and means for combining in opposition the output voltages of the two halves of said rectifying circuit whereby the combination of voltages so obtained will have a unique value which differs for each position of the rotor of said voltage divider.

GEORGE B. ENGELHARDT.

REFERENCES CITED

The following references are of record in the file of this patent:

UNITED STATES PATENTS

| Number | Name | Date |
| --- | --- | --- |
| 2,085,940 | Armstrong | July 6, 1937 |
| 2,288,740 | Peterson | July 7, 1942 |
| 2,189,549 | Hershberger | Feb. 6, 1940 |
| 2,231,929 | Lyman | Feb. 18, 1941 |
| 2,130,912 | Tolson | Sept. 20, 1938 |
| 1,992,433 | Klotz | Feb. 26, 1935 |
| 2,241,809 | DeForest | May 13, 1941 |
| 2,205,866 | Schweitzer | June 25, 1940 |
| 2,332,253 | Peterson | Oct. 19, 1943 |
| 2,275,974 | Mathes | Mar. 10, 1942 |

FOREIGN PATENTS

| Number | Country | Date |
| --- | --- | --- |
| 542,634 | Great Britain | Jan. 21, 1942 |

Disclaimer

2,421,747.—*George B. Engelhardt*, Hartsdale, N. Y. OBJECT LOCATING SYSTEM. Patent dated June 10, 1947. Disclaimer filed Jan. 20, 1950, by the assignee, *Bell Telephone Laboratories, Incorporated.*

Hereby enters this disclaimer to claims 6 and 7 of said patent.

[*Official Gazette February 21, 1950.*]